(12) United States Patent
Ryu et al.

(10) Patent No.: US 8,743,179 B2
(45) Date of Patent: Jun. 3, 2014

(54) SMALL STEREOSCOPIC IMAGE PHOTOGRAPHING APPARATUS (75) Inventors: Jae Wook Ryu, Ansan (KR); He-Won Jung, Ansan (KR); Jae-Kyu Shim, Ansan (KR); Hye-Kyoung Ji, Ansan (KR)

(73) Assignee: Hysonic Co., Ltd. (KR)

( * ) Notice: Subject to any disclaimer, the term of this patent is extended or adjusted under 35 U.S.C. 154(b) by 254 days.

(21) Appl. No.: 12/995,312

(22) PCT Filed: Sep. 21, 2009

(86) PCT No.: PCT/KR2009/005357
§ 371 (c)(1),
(2), (4) Date: Nov. 30, 2010

(87) PCT Pub. No.: WO2010/038947
PCT Pub. Date: Apr. 8, 2010

(65) Prior Publication Data
US 2011/0169920 A1 Jul. 14, 2011

(30) Foreign Application Priority Data
Sep. 30, 2008 (KR) .................. 10-2008-0095819

(51) Int. Cl.
*H04N 13/02* (2006.01)

(52) U.S. Cl.
USPC ....... 348/46; 348/E13.074; 396/324; 396/325

(58) Field of Classification Search
USPC .............. 348/46; 396/324, 325, 326
See application file for complete search history.

(56) References Cited

U.S. PATENT DOCUMENTS 5,778,268 A * 7/1998 Inaba ............................ 396/326
5,978,015 A * 11/1999 Ishibashi et al. ................ 348/47

(Continued)

FOREIGN PATENT DOCUMENTS

| JP | 10-026804 | 1/1998 |
| JP | 2005-024629 | 1/2005 |
| KR | 10-2006-0097549 | 9/2006 |
| KR | 10-2007-0013858 | 1/2007 |

OTHER PUBLICATIONS

Lee, Hyung-Kun, et al. "Application of ionic polymer-metal composites for auto-focusing compact camera modules." The 15th International Symposium on: Smart Structures and Materials & Nondestructive Evaluation and Health Monitoring. International Society for Optics and Photonics, Published date: May 1, 2008.*

(Continued)

*Primary Examiner* — Christopher S Kelley
*Assistant Examiner* — Ana Picon-Feliciano
(74) *Attorney, Agent, or Firm* — Cantor Colburn LLP (57) ABSTRACT Disclosed is a compact type 3D image photographing apparatus which adjusts a convergence angle with respect to a subject using two lenses in order to photograph a stereoscopic image. The compact type image photographing apparatus includes a housing; a first actuator having a first lens and disposed in the housing so as to be moved left and right; a second actuator having a second lens, disposed in the housing so as to be moved left and right, and disposed to be spaced apart from the first actuator; a left/right driving part which is disposed at each of the first and second actuators so as to move the first actuator or the second actuator left and right when power is applied; an image sensor which is disposed at each lower side of the first and second actuators so as to photograph a subject through the first and second lenses; and a control part which is disposed at a lower side of the image sensor so as to control power supplied to the left/right driving part, the first actuator and the second actuator.

3 Claims, 8 Drawing Sheets

(56) References Cited

U.S. PATENT DOCUMENTS

| | | | |
|---|---|---|---|
| 6,701,081 B1* | 3/2004 | Dwyer et al. | 396/329 |
| 7,148,916 B2* | 12/2006 | Fujiwara | 348/207.99 |
| 2006/0204239 A1* | 9/2006 | Inaba | 396/325 |
| 2007/0154198 A1* | 7/2007 | Oh et al. | 396/85 |
| 2008/0225129 A1* | 9/2008 | Viinikanoja et al. | 348/218.1 |
| 2009/0123144 A1* | 5/2009 | Maezono | 396/327 |

OTHER PUBLICATIONS

International Search Report-PCT/KR2009/005357 dated May 25, 2010.

* cited by examiner

Figure 10 a compact type 3-dimensional (3D) image photographing apparatus, and more particularly to a compact type 3D image photographing apparatus which adjusts a convergence angle with respect to a subject using two lenses in order to photograph a stereoscopic image.

BACKGROUND ART

The application field of mobile communication terminals that typically transmit audio information has been rapidly increasing with recent development of high speed data transmission technology. As a result, it has been a general tendency to transmit still images or videos using the mobile communication terminals, for example in on-demand mobile broadcasting service or multi-messaging service and so on.

However, users of the mobile communication terminal are not content with this, and they further require a new terminal which displays a stereoscopic image.

In order to satisfy the users' requirement, there have been proposed a new mobile terminal which can display a 3D image, and a new 3D image photographing apparatus which takes the 3D image.

DISCLOSURE

Technical Problem

An object of the present invention is to provide a compact type 3D image photographing apparatus in which two lenses are horizontally moved to the left and right so as to regulate a distance between the lenses, thereby adjusting a convergence angle with respect to a subject.

Technical Solution

To achieve the object of the present invention, the present invention provides a compact type image photographing apparatus, wherein a convergence angle with respect to a subject photographed on an image sensor is adjusted by controlling a distance between a first lens and a second lens on which an image of the subject is incident.

Further, the present invention provides a compact type image photographing apparatus, wherein a convergence angle with respect to a subject photographed on an image sensor is adjusted by controlling a distance between a first actuator having a first lens and a second actuator having a second lens on which an image of the subject is incident.

Preferably, the compact type image photographing apparatus, including a housing; a first actuator having a first lens and disposed in the housing so as to be moved left and right; a second actuator having a second lens, disposed in the housing so as to be moved left and right, and disposed to be spaced apart from the first actuator; a left/right driving part which is disposed at each of the first and second actuators so as to move the first actuator or the second actuator left and right when power is applied; an image sensor which is disposed at each lower side of the first and second actuators so as to photograph a subject through the first and second lenses; and a control part which is disposed at a lower side of the image sensor so as to control power supplied to the left/right driving part, the first actuator and the second actuator, wherein the control part adjusts a convergence angle with respect to the subject photographed on the image sensor by controlling a distance between the first and second actuators.

Preferably, the left/right driving part includes a first driving part disposed at one side surface of the first actuator which is opposite to the other side surface thereof adjacent to the second actuator, and a second driving part disposed at one side surface of the second actuator which is opposite to the other side surface thereof adjacent to the first actuator.

Preferably, the first driving part or the second driving part includes a coil member which is disposed at the first actuator or the second actuator; an iron piece of which one end is inserted into the coil member and the other end is fixed to the housing; and a magnet which is disposed at each of upper and lower surfaces of the iron piece.

Preferably, the compact type image photographing apparatus further includes a wire spring of which one end is fixed to the control part and the other end is fixed to the first actuator or the second actuator so as to elastically support the first actuator or the second actuator upward/downward, wherein the wire spring is provided in plural and connected with the left/right driving part, the first actuator and the second actuator so as to supply power from the control part.

Preferably, the first actuator or the second actuator includes a base which is disposed at an upper side of the image sensor; a lens holder which is disposed at an upper side of the base and provided with a first lens or a second lens; a polymer metal composite body which is contacted with the lens holder and bent so as to move the lens holder up and down when power is applied; and an electrode member which is disposed at each of upper and lower surfaces of the polymer metal composite body so as to apply the power, wherein the polymer metal composite body is provided in plural along an outer surface of the lens holder, and each of the polymer metal composite bodies includes a fixing part which is contacted with the electrode member and fixed to the base, and a moving part which is extended from the fixing part to form a higher step and bent when the power is applied, and the fixing part and the moving part of the different polymer metal composite bodies from each other are disposed to be adjacent to each other.

Advantageous Effects

According to the compact type 3D image photographing apparatus of the present invention, since the left/right driving part is disposed at the first and second actuators including the lenses, and a convergence angle with respect to a subject photographed on the image sensor is adjusted by controlling the distance between the first and second actuators, it is possible to form a stereoscopic image using the image photographed on the image sensor.

Further, since the left/right driving part includes the first driving part disposed at one side surface of the first actuator which is opposite to the other side surface thereof adjacent to the second actuator, and the second driving part disposed at one side surface of the second actuator which is opposite to the other side surface thereof adjacent to the first actuator, it is possible to minimize the distance between the first and second actuators and thus reduce the whole size of the first and second actuators.

Further, since the first driving part or the second driving part includes the coil member which is disposed at the first actuator or the second actuator; the iron piece of which one end is inserted into the coil member and the other end is fixed to the housing; and the magnet which is disposed at each of the upper and lower surfaces of the iron piece, it is possible to simplify the construction thereof and also enhance the drive quantity of the first and second actuators.

Furthermore, since the wire spring provided in plural is connected with the left/right driving part, the first actuator and the second actuator so as to supply the power from the control part, it is possible to minimize the number of whole components and thus simplify the assembling process.

In addition, since the fixing part and the moving part of the different polymer metal composite bodies from each other are disposed to be adjacent to each other, it is possible to reduce the whole size of the first and second actuators and also increase the up/down drive quantity of the first and second actuators.

DESCRIPTION OF DRAWINGS

The above and other objects, features and advantages of the present invention will become apparent from the following description of preferred embodiments given in conjunction with the accompanying drawings, in which.

BEST MODE

Hereinafter, the embodiments of the present invention will be described in detail with reference to accompanying drawings.

Figure 1:
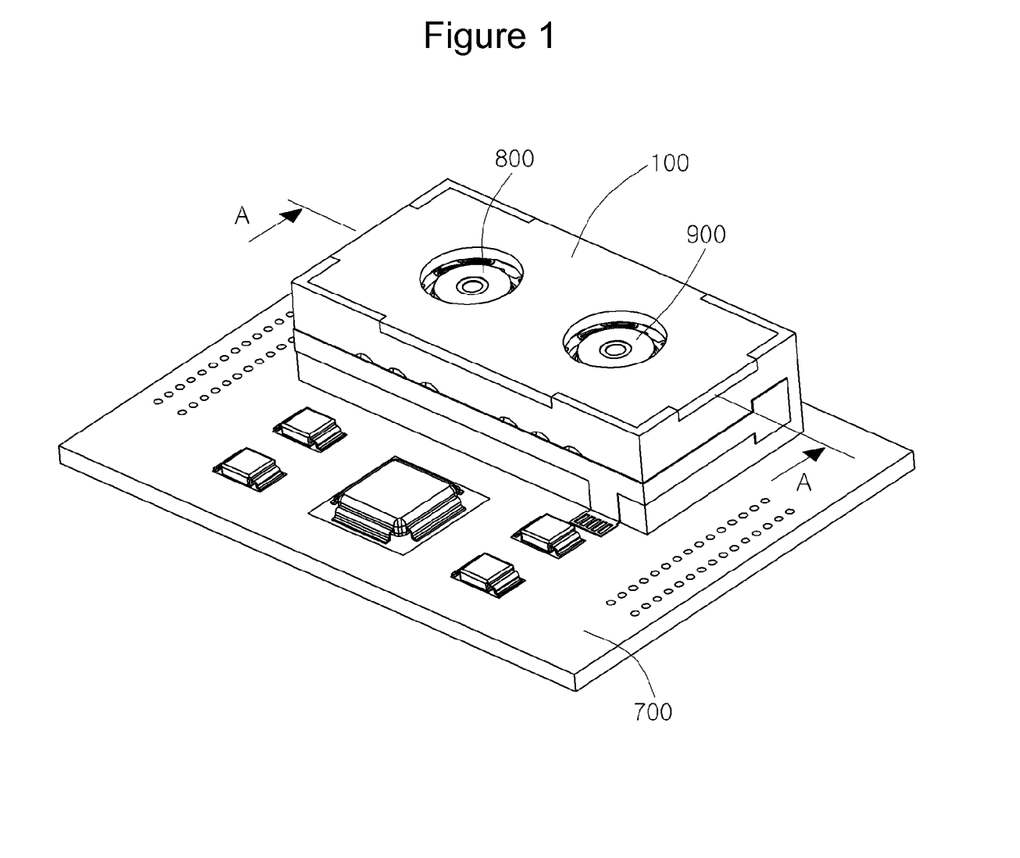
FIG. 1 is a perspective view of a compact type 3D image photographing apparatus according to an embodiment of the present invention.
Figure 2:
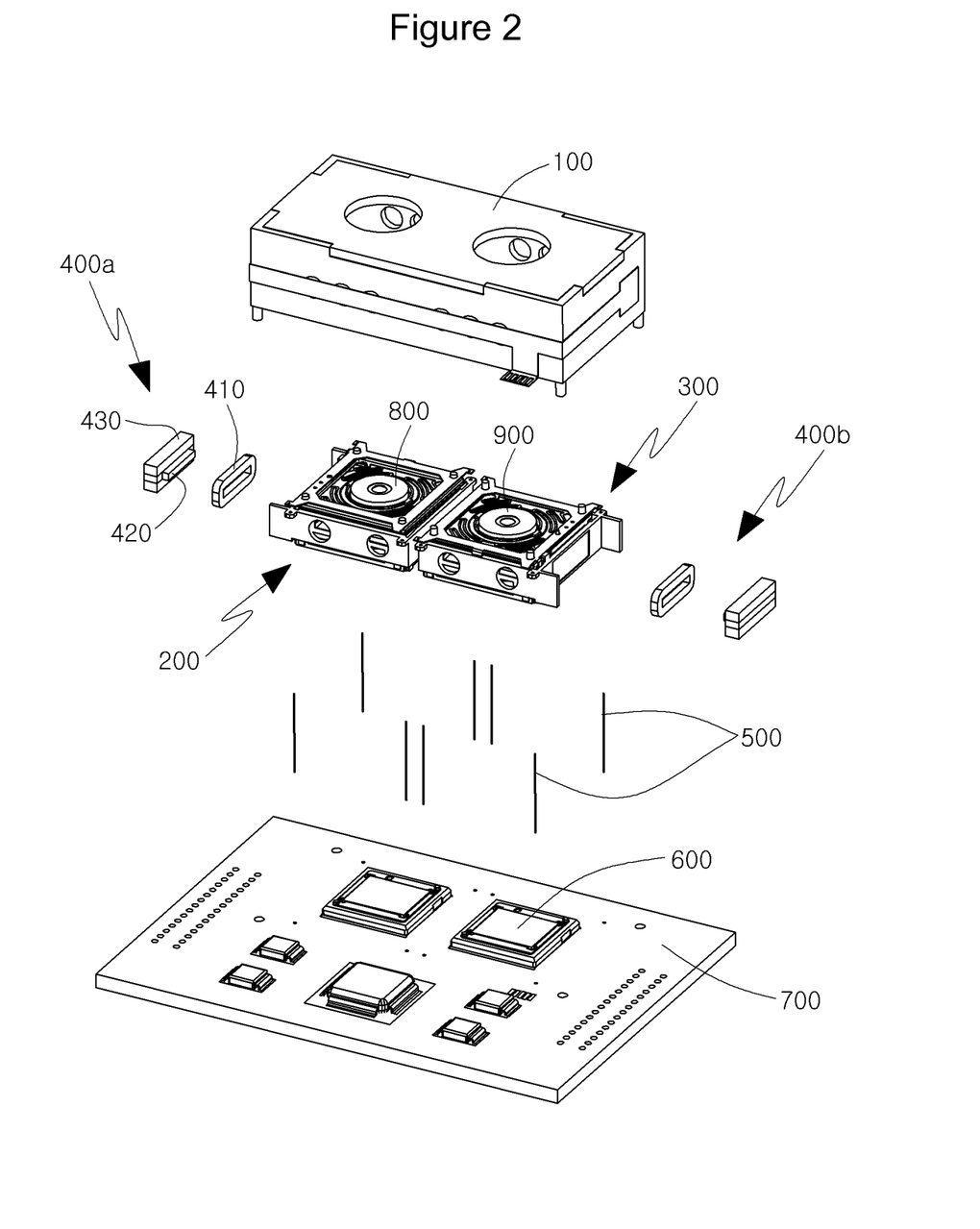
FIG. 2 is an exploded perspective view of the compact type 3D image photographing apparatus of FIG. 1.
Figure 3:
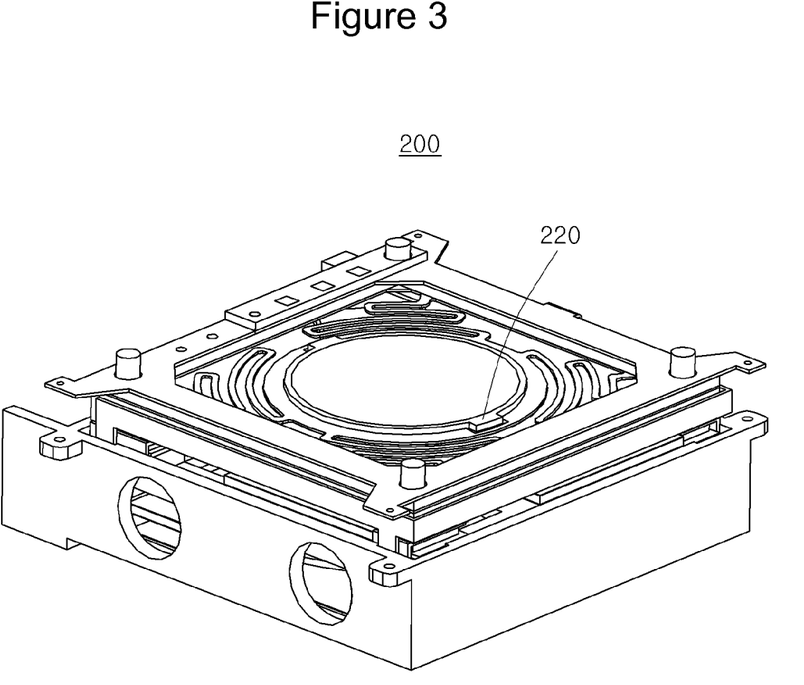
FIG. 3 is a perspective view of a first actuator in FIG. 2.
Figure 4:
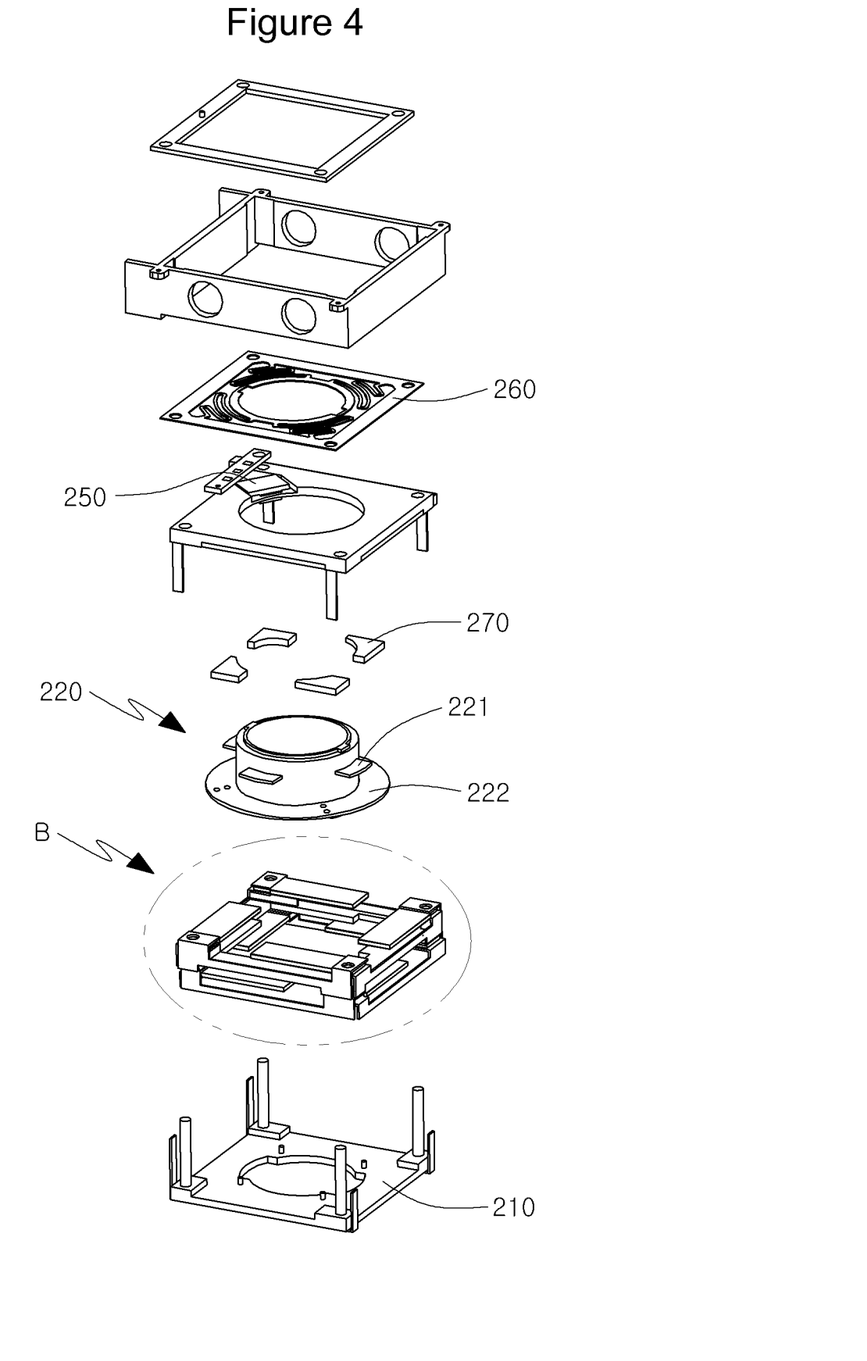
FIG. 4 is an exploded perspective view of a first actuator in FIG. 3.
Figure 5:
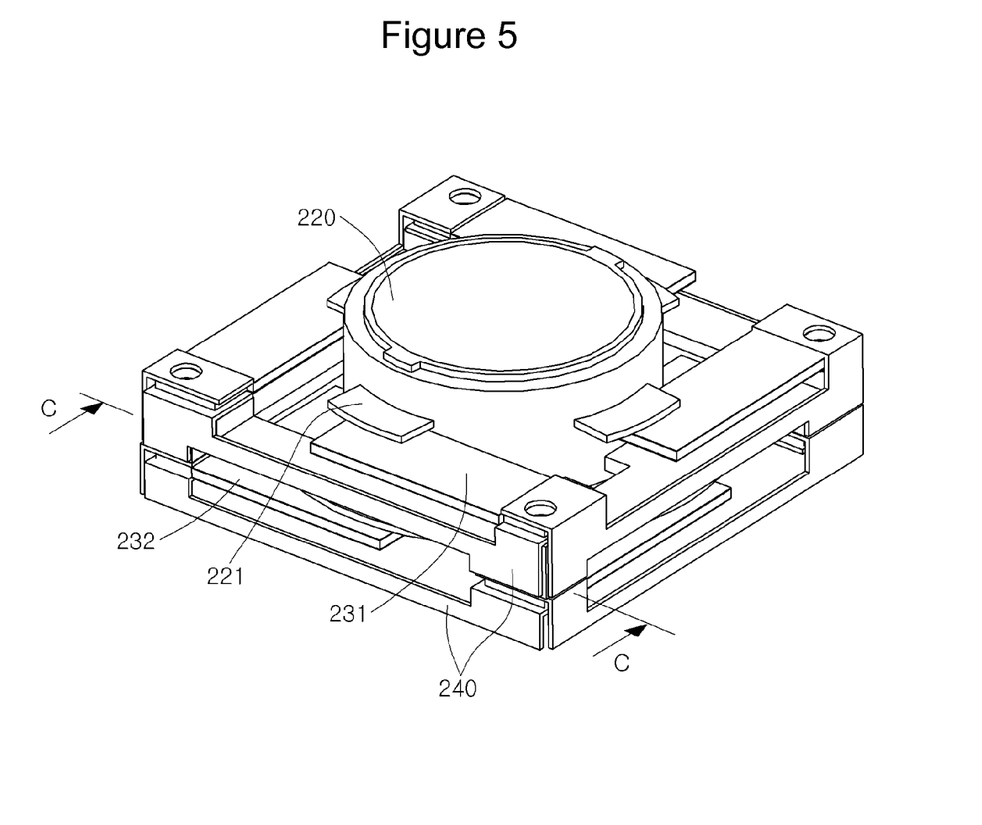
FIG. 5 is a perspective view showing the coupling between a lens holder and a polymer metal composite body in FIG. 4.
Figure 6:
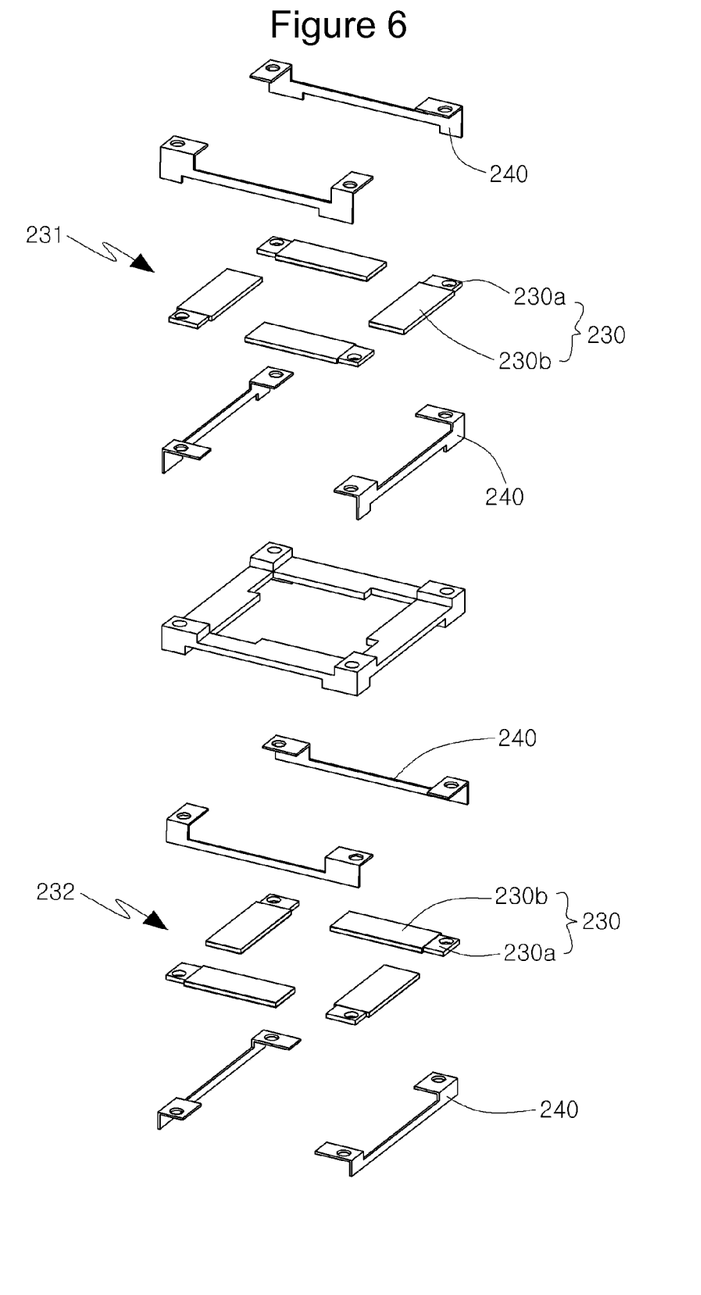
FIG. 6 is an enlarged and partially exploded perspective view of a part 'B' in FIG. 4.
Figure 7:
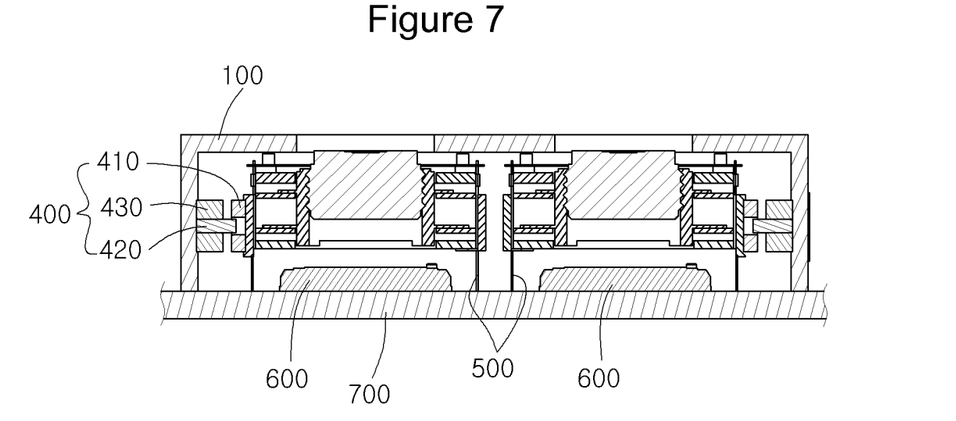
FIGS. 7 and 8 are cross-sectional views taken along a line A-A of FIG. 1, which shows an operation state of a left/right driving part.
Figure 8:
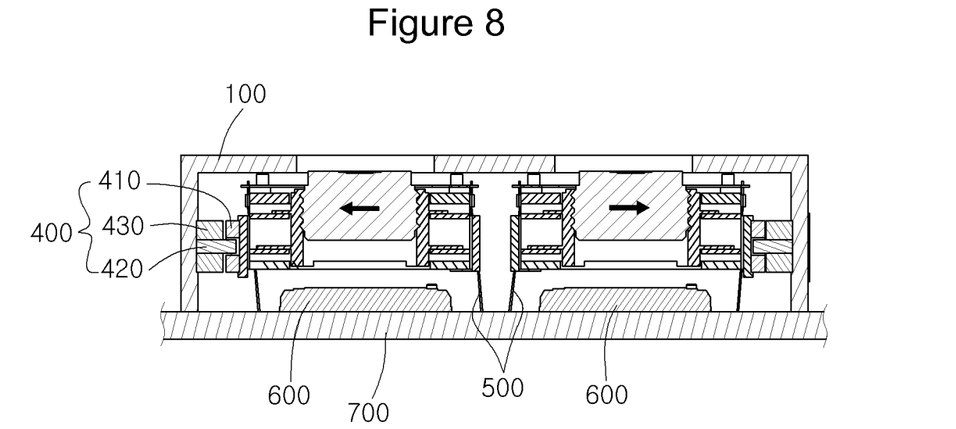
Figure 9:
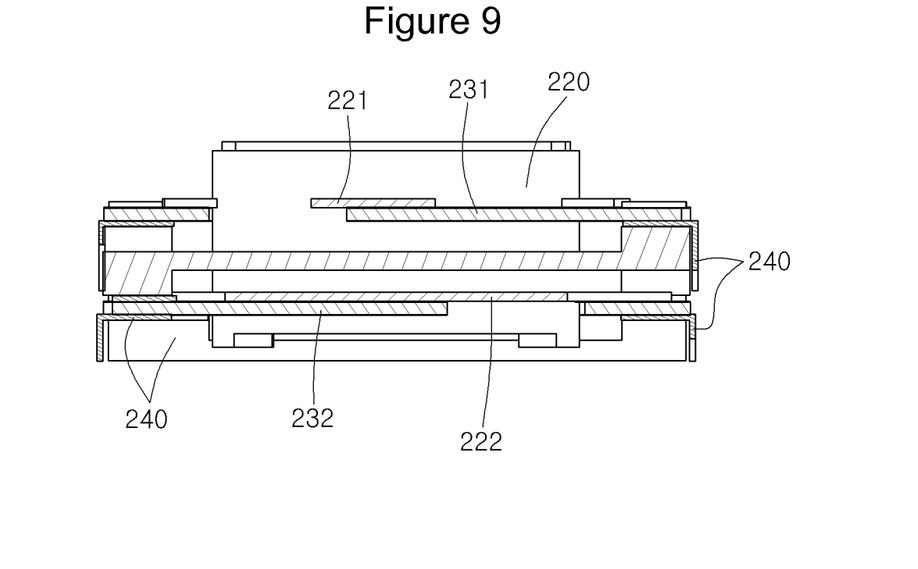
FIGS. 9 and 10 are cross-sectional views taken along a line C-C of FIG. 5, which shows an operation state of the first actuator.
Figure 10:
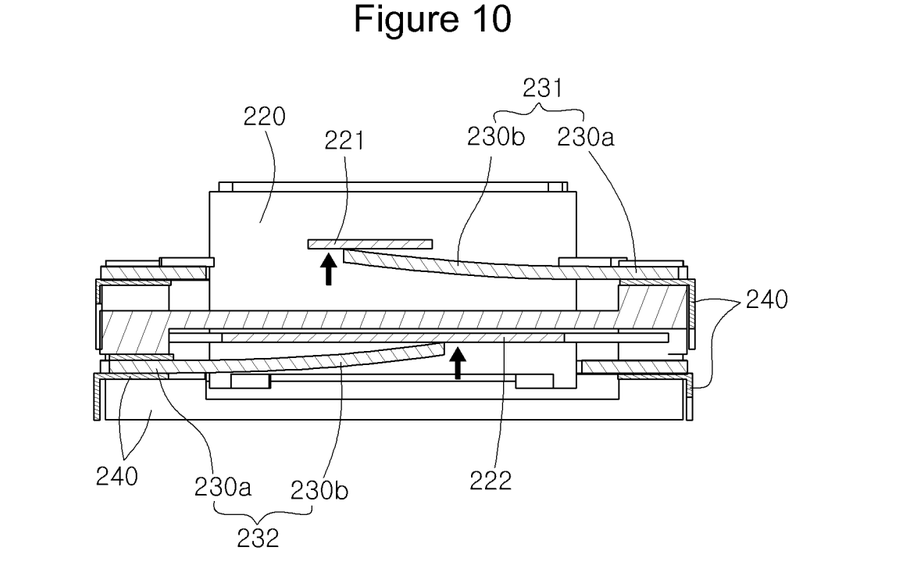

FIG. 1 is a perspective view of a compact type 3D image photographing apparatus according to an embodiment of the present invention; FIG. 2 is an exploded perspective view of the compact type 3D image photographing apparatus of FIG. 1; FIG. 3 is a perspective view of a first actuator in FIG. 2; FIG. 4 is an exploded perspective view of a first actuator in FIG. 3; FIG. 5 is a perspective view showing the coupling between a lens holder and a polymer metal composite body in FIG. 4; FIG. 6 is an enlarged and partially exploded perspective view of a part 'B' in FIG. 4; FIGS. 7 and 8 are cross-sectional views taken along a line A-A of FIG. 1, which shows an operation state of a left/right driving part; and FIGS. 9 and 10 are cross-sectional views taken along a line C-C of FIG. 5, which shows an operation state of the first actuator.

As shown in FIGS. 1, 2, 7 and 8, a compact type 3D image photographing apparatus of the present invention includes a housing 100, a first actuator 200, a second actuator 300, a left/right driving part 400, a wire spring 500, an image sensor 600 and a control part 700.

The housing 100 is formed into a rectangular shape which is disposed at an upper side of the control part 700 so as to cover the first and second actuators 200 and 300.

Further, an upper end of the housing 100 is detachably formed to open and close an upper side of the housing 100, and an open hole communicated with the first or second actuator 200 or 300 is formed at both sides of the housing 100.

The first actuator 200 having a first lens 800 and the second actuator 300 having a second lens 900 are disposed in the housing 100 so as to be moved left and right.

As shown in FIGS. 3 to 6, the first actuator 200 includes a base 210, a lens hold 220, a polymer metal composite body 230, an electrode member 240, a position sensor 250 and a plate spring 260.

The base 210 is disposed at an upper side of an image sensor 600, and the base 210 has a rectangular shape that an open hole communicated with the image sensor 600 is formed at a center portion thereof.

A fixing protrusion is formed at each corner portion of the base 210 to be protruded upward, and the polymer metal composite body 230 and the electrode member 240 are respectively inserted into the fixing protrusion.

The lens holder 220 is disposed at an upper side of the base 210.

The lens holder 220 is formed into a cylindrical shape in which the first lens 800 is inserted. And first and second supporting protrusions 221 and 222 contacted with the polymer metal composite body 230 are formed at an outer surface of the lens holder 220.

The first supporting protrusion 221 is protruded horizontally along the outer surface of the lens holder 220 to be symmetrically arranged at regular intervals around the lens holder 220.

That is, four first supporting protrusions 221 are disposed along the outer surface of the lens holder 220 at spaced angular intervals of 90°.

The second supporting protrusion 222 is disposed at a lower side of the first supporting protrusions 221 so as to be protruded horizontally along the outer surface of the lens holder 220. The second supporting protrusion 222 is formed into a single body without spaced intervals.

That is, the second supporting protrusion 222 having the shape of a disc is formed at the outer surface of the lens holder 220 to be spaced downward from the first supporting protrusion 221.

The polymer metal composite body 230 is disposed at each lower surface of the first and second supporting protrusions 221 and 222. The polymer metal composite body 230 functions to move the lens holder 220 up and down using the property that the polymer metal composite body 230 is bent when power is applied.

More detailedly, as shown in FIG. 6, the polymer metal composite body 230 is formed into a rectangular thin plate. The polymer metal composite body 230 includes a fixing part 230a which is contacted with the electrode member 240 and fixedly inserted into the base 210, and a moving part 230b which is horizontally extended from the fixing part 230a so to be bent upward and downward when power is applied.

Upper and lower surfaces of the fixing part 230a are respectively contacted with the electrode member 240 so as to transfer current to the polymer metal composite body 230, and the fixing part 230a and the electrode member 240 are fixedly inserted into the fixing protrusion of the base 210.

An upper surface of the moving part 230b is contacted with a lower surface of the first or second supporting protrusion 221 or 222 of the lens holder 220 so as to support the lens holder 220.

The polymer metal composite body 230 is provided horizontally in plural along the outer surface of the lens holder 220, such that the moving part 230b of one of the polymer metal composite bodies 230 is adjacent to the fixing part 230a of other polymer metal composite body 230.

In other words, the polymer metal composite bodies 230 are arranged along the outer surface of the lens holder 220 at angular intervals of 90°, and thus the fixing part 230a of one of the polymer metal composite bodies 230 is faced to the moving part 230b of other polymer metal composite body 230.

Therefore, the adjacent polymer metal composite bodies 230 are substantially at right angles to each other.

As described above, the plurality of polymer metal composite bodies are disposed along the outer surface of the lens holder 220. Each polymer metal composite body 230 includes the fixing part 230a which is contacted with the electrode member 240 and fixedly inserted into the base 210, and the moving part 230b which is extended from the fixing part 230a so to be bent upward and downward when power is applied. Since the fixing part 230a of one of the polymer metal composite bodies 230 is disposed to be adjacent to the moving part 230b of other polymer metal composite body 230, a contacted surface area with the lens holder 220 is increased, thereby improving stability. Further, it is possible to reduce a size of the polymer metal composite body 230 and thus maximize efficient utilization of an empty space, thereby obtaining the effect of reducing the whole size.

According to an arranged position of each polymer metal composite body 230, the polymer metal composite bodies 230 are classified into a first polymer unit 231 contacted with the first supporting protrusion 221, and a second polymer unit 232 contacted with the second supporting protrusion 222.

The first polymer unit 231 is disposed at a lower side of the first supporting protrusion 221 so that the moving part 230b is contacted with the lower surface of the first supporting protrusion 221. The second polymer unit 232 is disposed at a lower side of the second supporting protrusion 222 so that the moving part 230b is contacted with the lower surface of the second supporting protrusion 222.

Further, in each of the first and second polymer parts 231 and 232, the fixing parts 230a are arranged to be spaced apart from each other, and the moving parts 230b are arranged to be adjacent to each other on the basis of the certain first and second supporting protrusions 221 and 222.

That is, in each of the first and second polymer parts 231 and 232 which are disposed to be parallel with each other, the fixing parts 230a are disposed to be spaced apart from each other, and the moving parts 230b which are respectively extended from the fixing parts 230a to form a higher step are disposed to be adjacent to each other.

Therefore, the moving part 230b of the first polymer unit 231 and the moving part 230b of the second polymer unit 232 are overlapped with each other in a horizontal direction.

As described above, since the polymer metal composite body 230 is comprised of the first polymer unit 231 which is contacted with the first supporting protrusion 221, and the second polymer unit 232 which is disposed at the lower side of the first polymer unit 231 so as to be contacted with the second supporting protrusion 222, the number of the polymer metal composite bodies 230 is increased, and thus a drive quantity of the lens holder 220 is increased, and the contact surface area with the lens holder 220 is also increased, thereby enhancing the stability.

Further, upon the bending deformation of the first and second polymer parts 231 and 232, the first and second polymer parts 231 and 232 are differently bent to the right and left, respectively, thereby preventing the lens holder 220 from being inclined to one side.

Meanwhile, the electrode member 240 is disposed at the upper and lower surfaces of the polymer metal composite body 230 so as to apply power to the polymer metal composite body 230.

The electrode member 240 is made of a metallic material which conducts electricity. The electrode member 240 is provided in plural so as to be corresponded to the number of the polymer metal composite bodies 230, and each electrode member 240 is separated from each other so as to have different polarity respectively.

The electrode member 240 is contacted with upper and lower surfaces of the fixing part 230a of the polymer metal composite body 230 so as to apply the power to the polymer metal composite body 230.

Meanwhile, the plate spring 260 is disposed at an upper side of the lens holder 220 so as to elastically support the lens holder 220 downward, and thus the lens holder 220 can be returned to its initial position after it is ascended.

The position sensor 250 is disposed at the upper side of the lens holder so as to detect a position of the lens holder 220. Herein, a reflecting plate 270 is disposed at the second supporting protrusion of the lens holder 220 so as to reflect an output beam of the position sensor 250 through a gap between the first supporting protrusions 221.

Meanwhile, the second actuator 300 which is disposed to be spaced apart from the first actuator 200 has the same construction as the first actuator 200, except that the second lens 900 is inserted into the lens holder 220.

The left/right driving part 400 is disposed at each side surface of the first and second actuators 200 and 300 so as to move the first actuator 200 or the second actuator 300 to the right and left.

More detailedly, the left/right driving part 400 includes a first driving part 400a disposed at one side surface of the first actuator 200 which is opposite to the other side surface thereof adjacent to the second actuator 300, and a second driving part 400b disposed at one side surface of the second actuator 300 which is opposite to the other side surface thereof adjacent to the first actuator 200.

In other words, the left/right driving part 400 is disposed at each of the first and second actuators 200 and 300 so as to be spaced apart in opposite directions to each other, thereby minimizing a distance between the first and second actuators 200 and 300.

Further, each other the first and second driving parts 400a and 400b includes a coil member 410, an iron piece 420 and a magnet 430.

The coil member 410 is formed by winding a wire coated with an insulating material many times in one direction. The coil member 410 is fixed to the side surfaces of the first and second actuator 200 and 300.

The iron piece 420 is inserted into a center portion of the coil member 410.

One end of the iron piece 420, which 420 is inserted into the center portion of the coil member 410, disposed to have a desired space in an insertion direction, and the other end thereof is fixed to an inner surface of the housing adjacent to the first actuator 200 or the second actuator 300.

The magnet 430 is disposed at each of upper and lower surfaces of the iron piece 420.

Herein, polarity of each magnet 430 contacted with the upper and lower surfaces of the iron piece 420 is the same.

As described above, since the first driving part 400a or the second driving part 400b includes the coil member 410 which is disposed at the first actuator 200 or the second actuator 300; the iron piece 420 of which one end is inserted into the coil member 410 and the other end is fixed to the housing 100; and the magnet 430 which is disposed at each of the upper and lower surfaces of the iron piece 420, it is possible to simplify the construction thereof and also enhance the drive quantity.

Meanwhile, the wire spring 500 is formed to be extended in an up/down direction. One end of the wire spring 500 is fixed to the control part 700, and the other end thereof is fixed to the upper surface of the first actuator 200 or the second actuator 300 so as to elastically support the first actuator 200 or the second actuator 300.

More detailedly, the wire spring 500 is provided in plural. The wire springs 500 are connected to four symmetrical points on an outer side of the first actuator 200 and four symmetrical points on an outer side of the second actuator 300, respectively.

The wire spring 500 is formed of an elastic metal material which conducts electricity.

Two out of the four wire springs 500 connected with the first actuator 200 is used as power supply lines of the first actuator 200, and the rest two wire springs 500 are connected with the coil member of the first driving part 400a so as to supply the power to the first driving part 400a.

In the same way, the four wire springs 500 connected with the second actuator 300 function to supply the power to the second actuator 300 and the second driving part 400b.

The plurality of wire springs 500 are respectively connected with the left/right driving part 400, the first actuator 200 and the second actuator 300 so as to supply the power from the control part 700, thereby minimizing the number of whole components and thus simplifying the assembling process.

The image sensor 600 is disposed at each lower side of the first and second actuators 200 and 300 so as to photograph a subject through the first and second lenses 800 and 900.

The image sensor 600 is disposed at the control part 700 arranged at a lower side of the housing 100.

The control part 700 functions to control the power supplied through the wire spring 500 to the left/right driving part 400, the first actuator 200 and the second actuator 300.

If necessary, in order to precisely control the left/right driving part 400, the control part 700 may have a position sensor and control the left/right driving part 400 using position information of the first and second actuators 200 and 300.

Hereinafter, the operation of the compact type 3D image photographing apparatus according to the present invention, as described above, will be described.

As shown in FIG. 7, before the power is applied to the left/right driving part 400, the first and second actuators 200 and 300 are supported by the wire spring 500 so as to be floated over the image sensor 600, and the wire spring 500 is perpendicular to the control part 700.

If the control part 700 supplies the power to the left/right driving part 400 in order to adjust a convergence angle with respect to a subject, the first and second actuators 200 and 300 are horizontally moved according to an input value of the control part 700.

That is, as shown in FIG. 8, if the power is applied to the coil member 410, the first actuator 200 is horizontally moved to the left, and the second actuator 300 is horizontally moved to the right by magnetic field generated from the coil member 410 and the magnet 430, and thus the distance between the first and second actuators 200 and 300 is increased.

Herein, the wire spring 500 disposed at the first actuator 200 is inclined to the left together with the first actuator 200, and the wire spring 500 disposed at the second actuator 300 is inclined to the right together with the second actuator 300. As described above, the left/right driving part 400 is disposed at each of the first and second actuators 200 and 300 so as to adjust the distance between the first and second actuators 200 and 300 and thus the convergence angle with respect to the subject photographed on the image sensor 600. Therefore, a stereoscopic image can be formed by using an image photographed on the image sensor 600.

Furthermore, referring to FIGS. 9 and 10, the operation of the first actuator according to the present invention will be described.

As shown in FIG. 9, before the power is applied, the first and second polymer units 231 and 232 are parallelly surface-contacted with the first and second supporting protrusions 221 and 222, respectively.

When a subject is photographed on the image sensor 600, the control part 700 supplies the power to the first actuator 200 in order to control a focus of the subject.

As shown in FIG. 10, if the power is applied to the first actuator 200, the moving part 230b of the first polymer unit 231 and the moving part 230b of the second polymer unit 232 are bent upward.

Accordingly, the first supporting protrusion 221 contacted with the moving part 230b of the first polymer unit 231 and the second supporting protrusion 222 contacted with the moving part 230b of the second polymer unit 232 are moved upward.

Herein, since the first polymer unit 231 is bent from the right to the left, and the second polymer unit 232 is bent from the left to the right, it is possible to minimize the lens holder 220 from being inclined to the left and right.

As described above, since the fixing part 230a and the moving part 230b of the different polymer metal composite bodies 230 from each other are disposed to be adjacent to each other, it is possible to reduce the whole size of the first and second actuators 200 and 300 and also increase the up/down drive quantity of the first and second actuators 200 and 300.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention can be applied to a compact type image photographing apparatus such as a camera in a mobile phone so as to adjust the convergence angle with respect to a subject by controlling the distance between two lenses.

The invention claimed is:

1. A compact type image photographing apparatus, comprising:
 a housing;
 a first actuator having a first lens and disposed in the housing so as to be moved left and right;
 a second actuator having a second lens, disposed in the housing so as to be moved left and right, and disposed to be spaced apart from the first actuator;
 a left/right driving part which is disposed at each of the first and second actuators so as to move the first actuator or the second actuator left and right when power is applied;
 an image sensor which is disposed at each lower side of the first and second actuators so as to photograph a subject through the first and second lenses; and
 a control part which is disposed at a lower side of the image sensor so as to control power supplied to the left/right driving part, the first actuator and the second actuator,
 wherein the first actuator or the second actuator comprises:
 a base which is disposed at an upper side of the image sensor;

a cylindrical lens holder which is disposed at an upper side of the base and provided with a first lens or a second lens;

four first supporting protrusions attached around the cylindrical lens holder at 90-degrees angular intervals;

a second supporting protrusion attached around the cylindrical lends holder in the form of an annular disk spaced apart from the first supporting protrusions;

four first polymer metal composite bodies, each of which is formed of a first fixing part and a first moving part, each of the first moving parts being contacted with each of the four first supporting protrusions, respectively, the first moving parts being bent when power is applied such that the lens holder can moves up and down by the first moving parts of the first polymer metal composite bodies;

four second polymer metal composite bodies, each of which is formed of a second fixing part and a second moving part, the second moving parts being contacted with the second supporting protrusion, the second moving parts simultaneously being bent when power is applied such that the lens holder can moves up and down by the second moving parts of the second polymer metal composite bodies; and an electrode member which is electrically attached to the first and second polymer metal composite bodies so as to apply the power thereto such that the first moving parts and the second moving parts bend synchronously, wherein the control part adjusts a convergence angle with respect to the subject photographed on the image sensor by controlling a distance between the first and second actuators, wherein first driving part or second driving part comprises a coil member which is disposed at the first actuator or the second actuator; an iron piece of which one end is inserted into a center portion of the coil member and the other end is fixed to the housing; and a magnet which is disposed at each of upper and lower surfaces of the iron piece, and wherein the convergence angle with respect to the subject photographed on the image sensor is adjusted by controlling the distance between the first lens and the second lens on which an image of the subject is incident.

2. The compact type image photographing apparatus according to claim 1, wherein the left/right driving part comprises the first driving part disposed at one side surface of the first actuator which is opposite to the other side surface thereof adjacent to the second actuator, and the second driving part disposed at one side surface of the second actuator which is opposite to the other side surface thereof adjacent to the first actuator.

3. The compact type image photographing apparatus according to claim 1, further comprising a wire spring of which one end is fixed to the control part and the other end is fixed to the first actuator or the second actuator so as to elastically support the first actuator or the second actuator upward/downward, wherein the wire spring is provided in plural and connected with the left/right driving part, the first actuator and the second actuator so as to supply power from the control part.

* * * * *